UNITED STATES PATENT OFFICE.

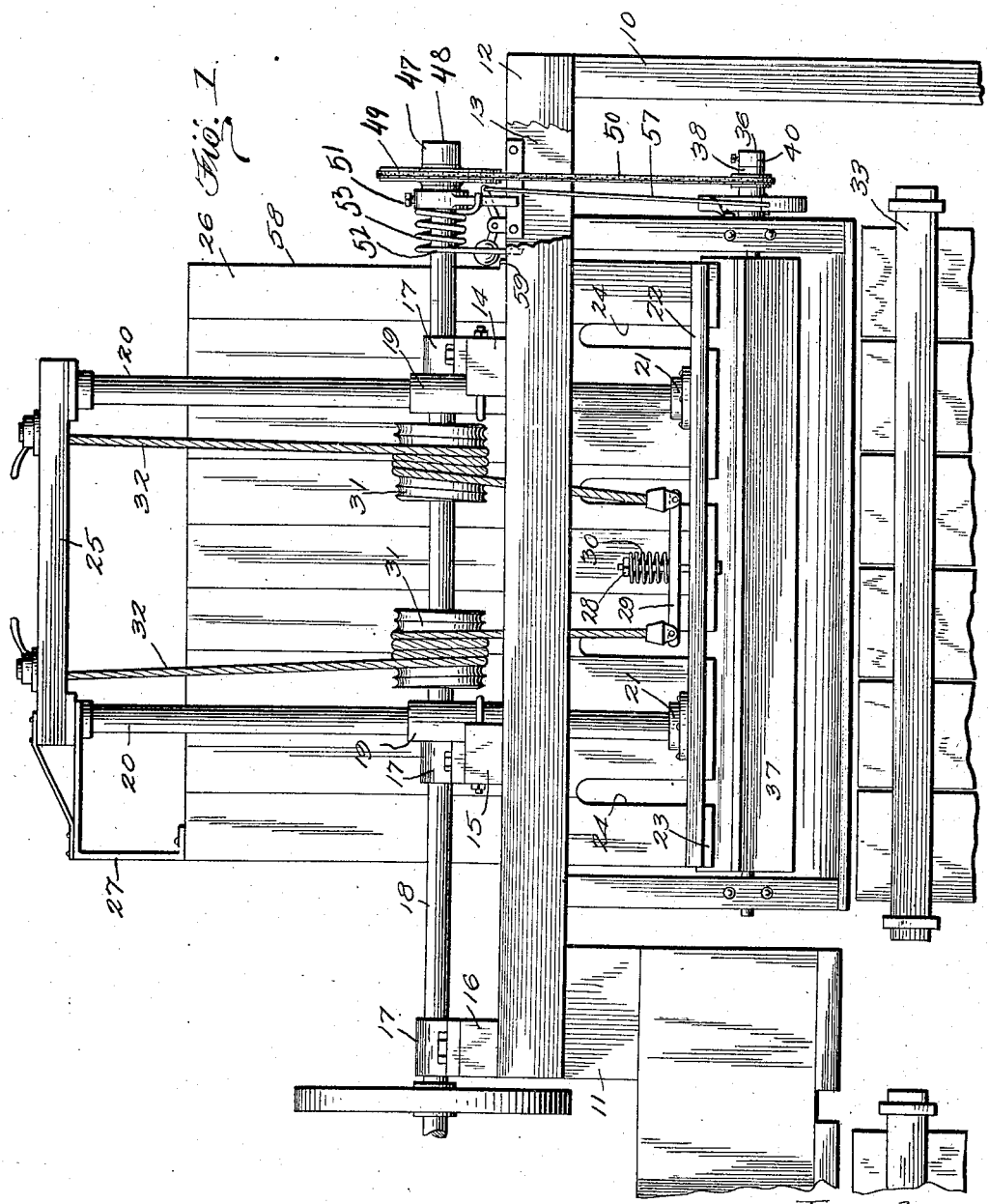

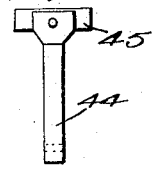
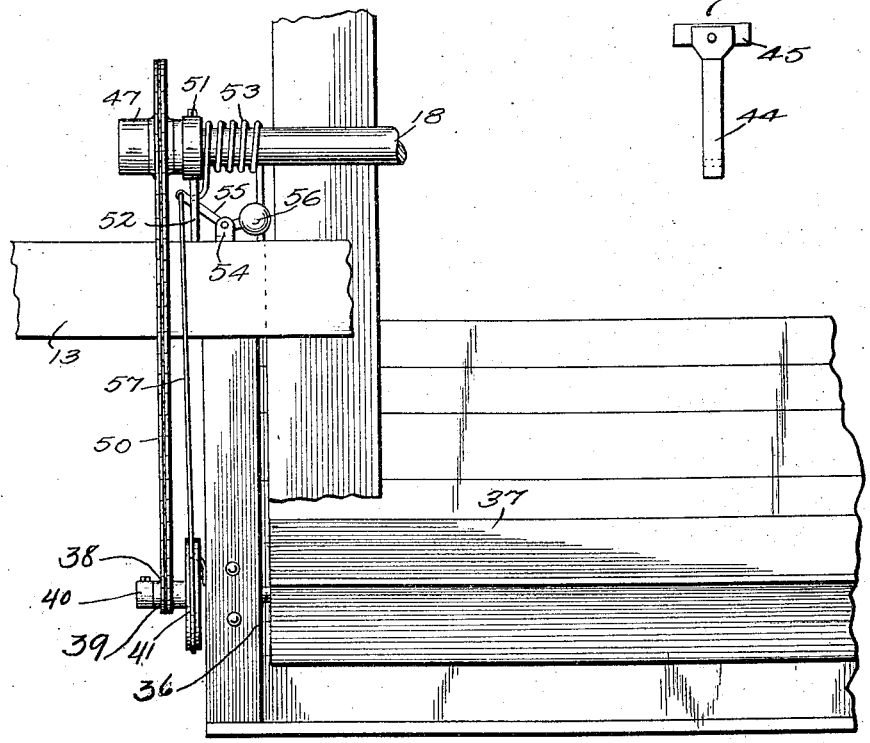
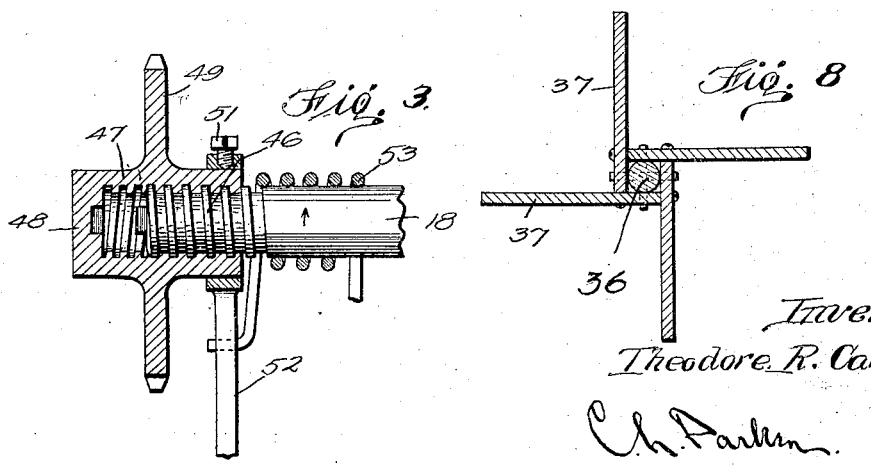

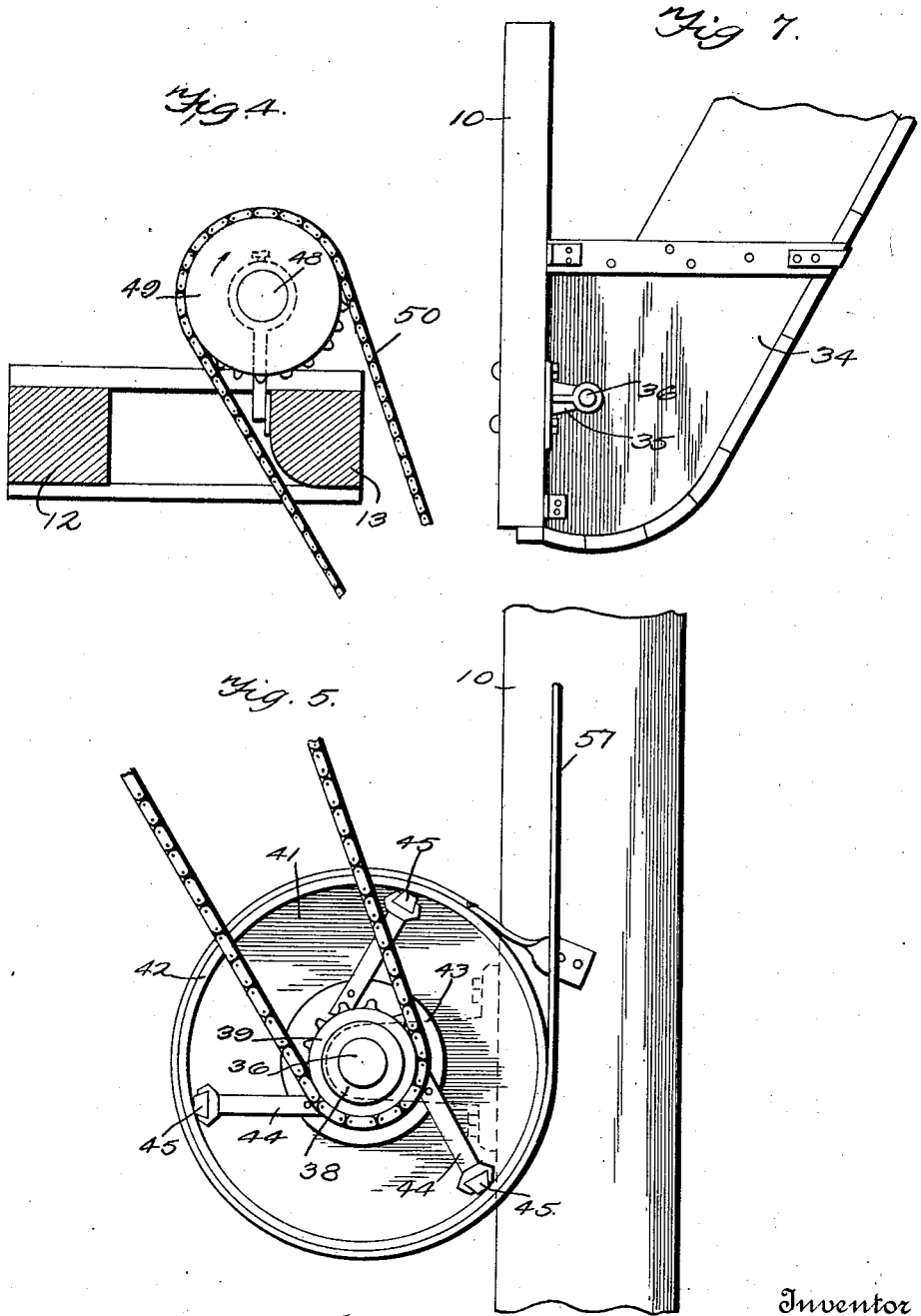

THEODORE R. CAMERON, OF SAN ANTONIO, TEXAS.

FEEDING APPARATUS FOR BALING-PRESSES.

1,352,785.  Specification of Letters Patent.  Patented Sept. 14, 1920.

Application filed September 2, 1919. Serial No. 321,208.

*To all whom it may concern:*

Be it known that I, THEODORE R. CAMERON, a citizen of the United States, residing at San Antonio, in the county of Bexar and State of Texas, have invented certain new and useful Improvements in Feeding Apparatus for Baling-Presses, of which the following is a specification.

This invention relates to new and useful improvements in cotton feeding devices for baling presses, and has for an object the provision of means for feeding cotton into the press at proper intervals.

A further object of the invention is to provide a feed paddle which operates one at a time when the press ram is in raised position.

Other objects and advantages of the invention will be apparent during the course of the following description.

In the accompanying drawings forming a part of this specification and in which like numerals are employed to designate like parts throughout the same, Figure 1 is a side elevation of a machine embodying my invention, Fig. 2 is an elevation of the paddle operating mechanism, viewed from the opposite side of the machine, Fig. 3 is a sectional view, partly in elevation of the operating shaft, Fig. 4 is an end elevation thereof, Fig. 5 is an end elevation of the paddle shaft, showing the ratchet release, Fig. 6 is a side elevation of one of the dogs of the ratchet mechanism, Fig. 7 is a side elevation of the feed trough, and, Fig. 8 is a transverse section taken through the feeder paddle.

Referring now more particularly to the drawings, the numerals 10 and 11 indicate suitable vertical supports to which are secured longitudinal horizontal supports 12 and 13. Mounted upon the longitudinal supports 12 and 13 are transverse horizontal supports 14, 15 and 16. Mounted upon the transverse supports 14, 15 and 16 are bearings 17, within which is rotatably mounted a shaft 18. Secured to the transverse supports 14, and 15 are vertical tubular guides 19, within which are slidably mounted ram posts 20. These posts are provided upon their lower ends with flanges 21 to which is secured the longitudinal frames 22 of the packing ram. To these longitudinal frames are secured transverse frames 23, affording spaces 24 for the reception of the usual baling tie. The upper ends of the ram posts are provided with a suitable cross bar 25, forming a connection therebetween. Secured to the packing ram is a lint shield 26, extending vertically from one side thereof. The lint shield is connected at its upper end by means of a brace 27 or the like, with the cross bar 25.

The packing ram is provided centrally thereof with an attaching member 28, upon which is slidably mounted a yoke 29. A spring 30 is mounted about the attaching member 28 and disposed between the yoke 29, and the upper end of the attaching member. Mounted upon the shaft 18 are winding drums 31, upon which are wound cables 32. One end of each of the cables is secured to the yoke 29 and the opposite end of the cable is secured to the cross bar 25. It will be seen that when the shaft 18 is rotated the packing ram is raised or lowered, dependent upon the direction of rotation of the shaft, into or out of the baling casing 33.

Mounted to one side of the baling casing 33 and opening immediately thereabove is a feed trough 34, secured to the vertical uprights 10. Mounted upon the vertical uprights 10 are journals 35, within which is rotatably mounted a shaft 36. Within the feed trough, shaft 36 is provided with paddles 37, secured thereto by bolts, rivets or the like. The paddles 37 are also secured to one another to form a rigid structure.

Rotatably mounted upon one end of the shaft 36 is a hub 38, bearing a sprocket wheel 39. The hub is held in position upon the shaft by a fixed collar 40. Secured to the shaft 36 is a drum 41 having an outstanding flange 42 upon the periphery thereof. The inner end of the hub 38 is provided with a vertical flange 43, to which are pivotally connected dogs 44, these dogs being provided with a frictional pad 45, adapted to engage the inner face of the outstanding flange 42 of the drum 41. It will be seen that if the sprocket 39 is rotated in one direction, these dogs grip the drum through the flange 42 and the shaft 36 is revolved. When the sprocket is rotated in the other direction, these dogs exercise no gripping action whatever.

One end of the shaft 18 is provided with screw-threads 46. Upon these screw-threads is mounted a hub 47 having a closed outer end 48. This hub bears a sprocket 49 which is connected by means of chain 50 with the sprocket 39, upon the shaft 36. Secured to the inner end of the hub as by means of set screws 51 or the like, is a stop member 52. A spring 53 having one end secured to one of the horizontal supports surrounds the shaft 18, the free end of the spring engaging the stop member 52. It will readily be seen by referring to Fig. 3, that when the shaft 18 is rotated in the direction of the arrow, the sprocket 49 does not move until the end of the shaft abuts the closed end 48 of the hub 47 and that this motion of the shaft is then stopped by the stop member 52, engaged against the side of the beam 13. Pivotally mounted in a bracket 54 is a bell crank 55, one end of the bell crank being weighted as at 56. The opposite end of the bell crank receives the upper end of a strap 57. The lower end of the strap encircles the flange 42 of the drum 41, and is secured in any suitable manner, as to the vertical upright 10. It will be seen that the weighted end of the lever exerting the braking effect upon the strap 57 acts as a brake for the drum 41, and checks motion of the drum when released. The weighted end 56 extends adjacent the lint shield 26 and the lint shield is supplied with a cut-out portion 58, terminating in a shoulder 59. It will be seen that as the lint shield is raised, the shoulder 59 engages the weighted end 56 of the lever, lifting this end and releasing the strain upon the brake drum, allowing the same to revolve.

The operation of my device is as follows:

The shaft 18 is revolved in any suitable manner. Presuming the lint shield to be in the elevated position, the shield is lowered until the ram engages the cotton. The paddles in the feeder do not revolve as the dogs 44 do not engage the flange 42 when revolved in this direction. Furthermore, when the shield has been lowered to the position shown in Fig. 1, the brake is actuated by the weight 56, holding the paddles stationary. As the ram and lint shield are raised, at the time when the ram attains the position shown in Fig. 1, the end of the shaft 18 engages the closed end 48 of the hub 47, and the sprocket 49 is rotated in the direction of the arrow in Fig. 4. In this direction of rotation, the frictional pads of the dogs 44 engage the flange 42 of the drum 41 and the shaft is rotated. Simultaneously, the shoulder 59 engages the weight 56, releasing the brake band from the drum to permit of free rotation of the paddles and a charge is supplied in the baling casing 33.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. In a baling press, a ram, a rotatable shaft, means operated by the rotation of said shaft for raising and lowering said ram, a rotatable paddle shaft, a feeder paddle mounted thereon, a hub mounted upon said first named rotatable shaft and adapted to engage said shaft and rotate therewith after the shaft has rotated a predetermined number of times in one direction, and be released from said shaft after the shaft has rotated a predetermined number of times in the opposite direction, and means operated by the rotation of said hub for rotating said paddle shaft.

2. In a baling press, a ram, a rotatable shaft provided upon one end with external screw-threads, means operated by the rotation of said shaft for raising and lowering said ram, a rotatable paddle shaft, a feeder paddle mounted thereon, a hub provided with internal screw-threads mounted upon the screw-threads of said first named rotatable shaft, said hub being provided with a closed end adapted to be engaged by the end of said shaft whereby said hub is adapted to be rotated by said shaft when the shaft has rotated a predetermined number of times, and means operated by the rotation of said hub for rotating said paddle shaft.

3. In a baling press, a ram, a lint shield carried by said ram, a rotatable shaft, means operated by the rotation of said shaft for raising and lowering said ram and lint shield, a rotatable paddle shaft provided with a brake, means positively connecting said first named shaft and said paddle shaft during a portion of the upward travel of said ram and lint shield whereby said paddle shaft is rotated, means for applying said brake when the shafts are not positively connected, and means actuated by the rotation of said first named shaft for rotating said paddle shaft, said brake preventing the rotation of said paddle shaft when said ram and lint shield are being lowered.

4. In a baling press, a ram, means for operating said ram, a feeder paddle, means positively connecting said operating means and said paddle during a predetermined portion of the operating stroke of said ram to rotate said paddle and a brake engaging said paddle and preventing rotation thereof during the period of said stroke when said operating means is disconnected from said paddle.

5. In a baling press, a ram, operating means therefor embodying a rotatable shaft, a member mounted upon said shaft and normally stationary with relation thereto, said member being adapted, when the shaft has rotated a predetermined number of revolutions in one direction, to engage said shaft and rotate therewith, a feeder paddle, and means connecting said feeder paddle and said member whereby said paddle is rotated.

6. In a baling press, a ram, operating means therefor embodying a rotatable shaft, a member mounted upon said shaft and normally stationary with relation thereto, said member being adapted, when the shaft has rotated a predetermined number of revolutions in one direction, to engage said shaft and rotate therewith, and means carried by said member for limiting the rotation of said shaft and member after the engagement of said shaft by said member.

In testimony whereof I affix my signature in presence of two witnesses.

THEODORE R. CAMERON.

Witnesses:
F. A. HILL,
ALFONSO Y. GARCIA.